US010516675B2

(12) United States Patent
Elyashar et al.

(10) Patent No.: US 10,516,675 B2
(45) Date of Patent: Dec. 24, 2019

(54) ALTERING APPLICATION SECURITY TO SUPPORT JUST-IN-TIME ACCESS

(71) Applicant: Microsoft Technology Licensing, LLC, Redmond, WA (US)

(72) Inventors: Gilad Michael Elyashar, Tel Aviv (IL); Royi Ronen, Tel Aviv (IL); Efim Hudis, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/605,679

(22) Filed: May 25, 2017

(65) Prior Publication Data

US 2018/0205736 A1    Jul. 19, 2018

Related U.S. Application Data

(60) Provisional application No. 62/447,331, filed on Jan. 17, 2017.

(51) Int. Cl.
| | |
|---|---|
| *G06F 21/00* | (2013.01) |
| *H04L 29/06* | (2006.01) |
| *G06F 9/455* | (2018.01) |
| *G06F 21/62* | (2013.01) |

(52) U.S. Cl.
CPC ........ *H04L 63/105* (2013.01); *G06F 9/45504* (2013.01); *G06F 21/6281* (2013.01); *H04L 63/108* (2013.01); *G06F 2221/2137* (2013.01)

(58) Field of Classification Search
CPC . H04L 63/105; H04L 63/108; G06F 9/45504; G06F 21/6281; G06F 2221/2137
See application file for complete search history.

(56) References Cited

U.S. PATENT DOCUMENTS

| | | | |
|---|---|---|---|
| 5,809,230 A | 9/1998 | Pereira | |
| 7,483,945 B2 | 1/2009 | Blumofe | |
| 7,631,351 B2 | 12/2009 | Erofeev | |
| 8,214,481 B2 | 7/2012 | Savage et al. | |
| 8,380,988 B2 | 2/2013 | Krahn et al. | |
| 9,104,434 B2* | 8/2015 | Miadowicz | G06F 8/443 |
| 9,165,155 B2 | 10/2015 | Druschel et al. | |

(Continued)

OTHER PUBLICATIONS

Neira, et al., "Privileged Access Management for Active Directory Domain Services", https://docs.microsoft.com/en-us/microsoft-identity-manager/pam/privileged-identity-managemet-for-active-directory-domain-services, Published on: Jan. 10, 2017, 7 pages.

(Continued)

*Primary Examiner* — Ghodrat Jamshidi
(74) *Attorney, Agent, or Firm* — Dicke, Billig & Czaja, PLLC

(57) ABSTRACT

A method and a computing system for allowing just-in-time ("JIT") access to a machine is provided. A system receives a request to allow JIT access to the machine. The system directs a port of the machine to be opened for a JIT access period. The system also directs the machine to alter security relating to applications allowed to execute on the machine for the JIT access period. During the JIT access period, the machine can be accessed via the port with the altered security relating to applications. After the JIT access period, the system directs the port to be closed and directs the security to return to the unaltered security.

17 Claims, 8 Drawing Sheets

(56) References Cited

U.S. PATENT DOCUMENTS

| | | | |
|---|---|---|---|
| 2006/0101145 A1 | 5/2006 | Hoffman et al. | |
| 2007/0199044 A1 | 8/2007 | Hughes | |
| 2010/0095122 A1* | 4/2010 | Bettger | H04L 12/1831 713/170 |
| 2011/0219447 A1* | 9/2011 | Horovitz | G06F 9/45533 726/22 |
| 2012/0011561 A1* | 1/2012 | Courtney | G06F 21/604 726/1 |
| 2013/0091171 A1* | 4/2013 | Lee | G06F 21/41 707/784 |
| 2014/0208100 A1* | 7/2014 | Kendall | H04L 9/0863 713/164 |
| 2014/0351392 A1* | 11/2014 | Baker | H04L 41/0809 709/220 |
| 2015/0271200 A1 | 9/2015 | Brady et al. | |
| 2015/0358349 A1 | 12/2015 | Holden et al. | |
| 2016/0021057 A1 | 1/2016 | Frost et al. | |
| 2016/0337358 A1* | 11/2016 | Tonnelier | G06F 16/9554 |
| 2016/0366135 A1* | 12/2016 | Furuichi | H04L 41/085 |
| 2017/0126640 A1* | 5/2017 | Vincent | G06F 21/31 |
| 2017/0134392 A1* | 5/2017 | Chattopadhyay | H04L 63/108 |
| 2018/0083984 A1* | 3/2018 | Frost | G06F 9/45558 |

OTHER PUBLICATIONS

"International Search Report and Written Opinion Issued in PCT Application No. PCT/US18/013690", dated Apr. 20, 2018, 15 Pages.

* cited by examiner

```
100
┌─────────────────────────────────────────────┐ ✕
│                                             │
│            Request JIT Access               │
│                                             │
│   101      machine:      _____        │
│   102         port:      _____        │
│   103   access period:   _____ (minutes) │
│   104     user name:     _____        │
│   105      password:     _____        │
│   106        token:      _____        │
│                                             │
│   107  Suspend Allowed List   ○ yes   ○ no  │
│                                             │
│           108    ( Submit )                 │
└─────────────────────────────────────────────┘
```

*FIG. 1*

ALTERING APPLICATION SECURITY TO SUPPORT JUST-IN-TIME ACCESS

CROSS-REFERENCE TO RELATED APPLICATION

This application claims the benefit of U.S. Provisional Application No. 62/447,331, filed on Jan. 17, 2017, which is hereby incorporated by reference in its entirety.

BACKGROUND

Cyber-attacks cost companies and individuals billions of dollars. A report in 2015 estimated that cyber-attacks cost companies over $400 billion annually. In addition to the financial costs, cyber-attacks may result in other damages such as the destruction of valuable information, the release of sensitive information, and so on. The costs and damages will surely increase over time without effective defenses. Cyber-attacks often rely on malicious software, referred to as "malware," which is installed and executed by a computer that is the target of the attack. The executing malware orchestrates the attack. For example, a ransomware attack may encrypt all the data on a computer, including the only copies of financial documents, family photographs, electronic mail messages, and so on. If the ransom is not paid, then the data may remain encrypted forever. Even if the ransom is paid, the attacker might not provide the key to decrypt the data. Because of the high costs of cyber-attacks, companies and individuals expend considerable resources in developing and purchasing security systems as defenses to cyber-attacks. These security systems include firewall systems, antivirus systems, authentication systems, intrusion prevention systems, access control systems, application blocking systems, and so on.

Malware can be installed on a computer in various ways. For example, ransomware may arrive as an email attachment that contains garbled content and a malicious macro. When the user opens the attachment, the attachment requests the user to enable macros if the content appears garbled. When the user enables the macros, the malicious macro installs and executes the ransomware. As another example, an employee of a corporation may install an unauthorized application on their computer. Normally, the information technology group of a corporation analyzes and authorizes only those applications that meet the strict security standards of the corporation. If an unauthorized application is installed, it can expose all the computers on the network of the corporation to vulnerabilities that significantly increase the chance of a cyber-attack against the corporation.

In a cloud data center, an especially pervasive type of attack is a password attack. To mount a password attack, an attacker identifies an open port on a machine (e.g., physical machine or virtual machine). Knowledge of a user name and a password is typically required to gain access to an open port. If the attacker knows the names of employees of a company, it may be relatively easy to guess the user names. The guessing is especially easy if the attacker knows the algorithm used by the information technology department of the organization in assigning user names. For example, the user name may be the same as the local part of the electronic mail address for the employee. If the address is "jsmith@acme.com," then the user name is "jsmith." An attacker may use various types of password attacks such as a brute-force attack or a dictionary attack. With a brute-force attack, the attacker performs a systematic search of the password space starting with most commonly used passwords (e.g., "Password123"). With a dictionary attack, the attacker generates passwords from a dictionary of words such as trying all short words and combinations of short words. So the attacker may, for each password, cycle through the user names, trying that password with that user name until the attacker gains access.

To defend against password attacks, a cloud data center may have a management portal that controls the opening and closing of the ports of the machines so that a port is only open for an authorized access. When a user (e.g., employee or system administrator) wants to log on to a machine, the user first logs on to the management portal, which may require a multi-factor authentication technique such as one that requires a password and one-time code that is sent to the user's smart phone or that is generated by the user's smart phone using a synchronized software token generator. The use of multi-factor authentication is considered to be an enhanced authentication, whereas the use of only a password is considered to be a non-enhanced authentication. Once the user logs on to the management portal, the user requests that the port of a certain machine, which is normally closed, be opened for an access period (e.g., one hour). The management portal may direct the firewall for the machine to open the port for the access period, after which the firewall closes the port. Alternatively, the management portal may direct the firewall to open the port and then, after the access period, direct the firewall to close the port. While the port is open, the user can log on to the machine. Since the port is normally closed and is likely open only a very short time before the user logs on, the "attack surface" of the machine is very small. Such opening of ports for only an authorized access and for only an access period is referred to as just-in-time ("JIT") access for a JIT access period.

An organization may have thousands of servers and thousands of user computers (e.g., desktops and laptops) connected to its network. The servers may each be a certain type of server, such as a load balancing server, a firewall server, a database server, an authentication server, a personnel management server, a web server, a file system server, and so on. In addition, the user computers may each be a certain type, such as a management computer, a technical support computer, a developer computer, a secretarial computer, and so on. Each server and user computer may have various applications installed that are needed to support the function of the computer. Because of the various types of servers and user computers, such a network is referred to as a "hybrid environment."

It can be a difficult task to ensure that each computer can execute only authorized applications. As used herein, the term "application" refers to any software that can be separately identified and executed, such as application programs, applets, dynamic-link libraries, operating system software, scripts, add-ins, operating system drivers, and so on. To help support this difficult task, security tools may be installed on each computer to help ensure that only certain authorized applications are allowed to execute on each computer. The security tool may allow an administrator to generate an allowed list for each computer that lists the authorized applications that are allowed to be executed by that computer. When the operating system executing on a computer receives a request to execute an application, the operating system asks the security tool whether to allow the execution. If the application is in the allowed list, the security tool indicates that execution is allowed. Otherwise, the security tool indicates that the execution is to be blocked.

SUMMARY

A method and a computing system for allowing JIT access to a machine is provided. In some embodiments, an alter application security ("AAS") system receives a request to allow JIT access to the machine. The AAS system directs a port of the machine to be opened for a JIT access period. The AAS system also directs the machine to alter security relating to applications allowed to execute on the machine for the JIT access period so that applications that are needed during the JIT access period can execute. During the JIT access period, the machine can be accessed via the port with the altered security relating to the applications. After the JIT access period, the AAS system directs that the port be closed and directs that security return to its state prior to being altered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 illustrates a display page of a management portal through which a user can request JIT access in some embodiments.

DETAILED DESCRIPTION

Figure 2:
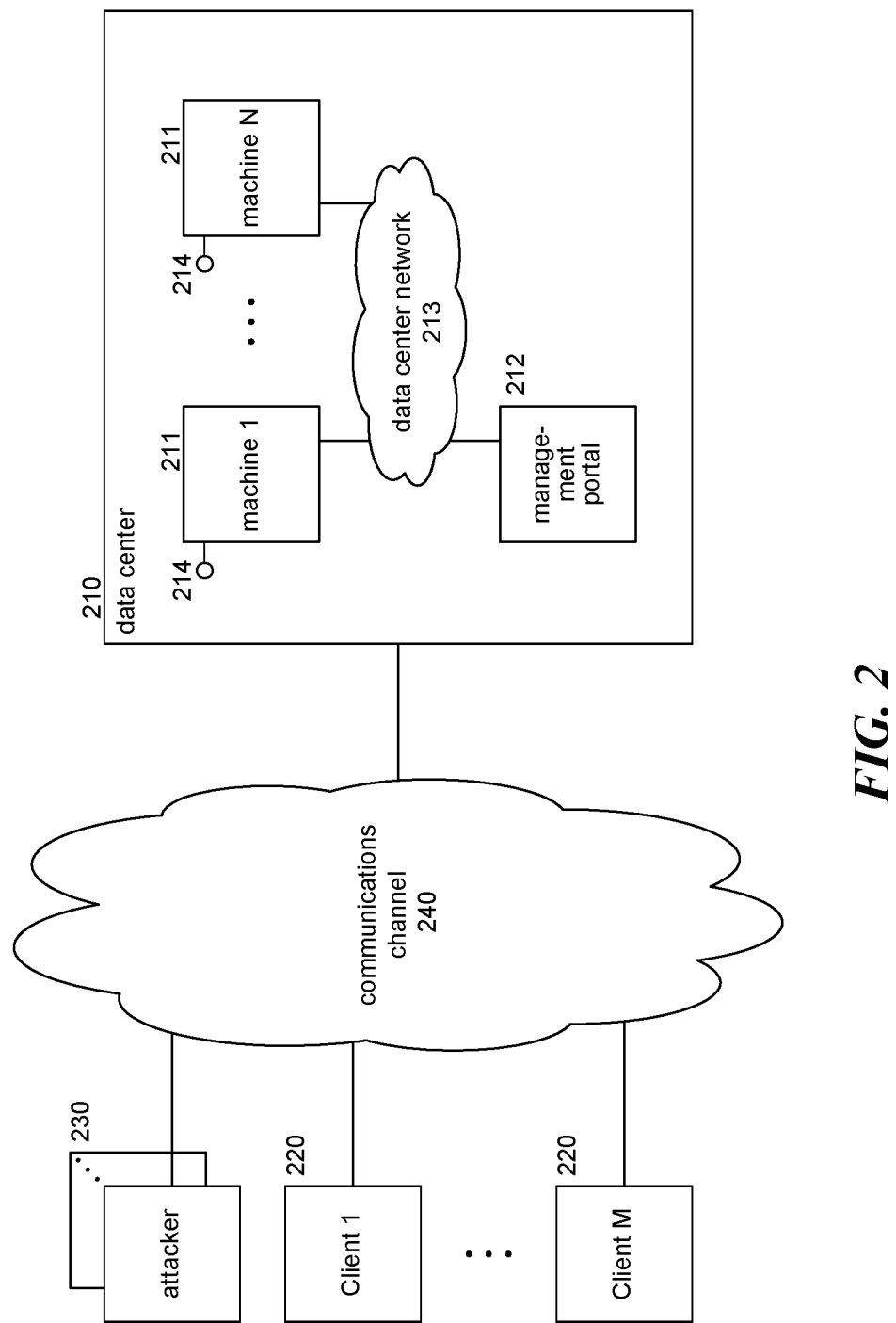
FIG. 2 is a block diagram that illustrates client devices that connect to machines of a data center in some embodiments.

In some embodiments, an alter application security ("AAS") system is provided that allows JIT access to a machine by not only opening a port but also altering application security of the machine so that the user requesting access can perform a task with the altered application security. The AAS system helps overcome a problem that occurs when a port is opened for JIT access. The problem is that if the machine has an allowed list of applications, an application that needs to execute for the user to perform a desired task may not be on the allowed list. For example, a system administrator may request JIT access to perform a maintenance operation on a machine such as changing a security parameter, installing a new program or new version of a program (e.g., operating system or hypervisor), installing a new device driver, and so on. For security reasons, the applications needed to support the maintenance operation would not normally be on the allowed list because a user who is not a system administrator should not have access to those applications.

In some embodiments, the AAS system, which may be a component of the management portal, may alter the application security of the machine to support JIT access using various techniques. For example, the AAS system may direct a security tool of the machine to suspend enforcement of the allowed list so that any application can be executed. As another example, the AAS system may prompt a user to specify the applications that need to be executed. The AAS system may then direct the security tool of the machine to either replace the allowed list with a list of only the specified applications or add the specified applications to the allowed list. As another example, rather than having an allowed list, a machine may have a prohibited or blocked list, indicating that any application can be executed by the machine except those on the blocked list. In such a case, the AAS system may direct that an application that needs to be executed be removed from the blocked list. As another example, the security tool of a machine may have multiple allowed lists associated with different permissions. When JIT access is granted, the AAS system may grant the user permission to access the allowed list that includes the needed applications, for example, by adding the user's name to a list of authorized users for the allowed list. Some security tools may have an alert list of applications such that when an application on the alert list is executed, an alert is sent to notify a system administrator. The AAS system may suspend the sending of such alerts because the execution of the applications is authorized during the JIT access period.

FIG. 1 illustrates a display page of a management portal through which a user can request JIT access in some embodiments. A display page 100 includes data entry fields 101-107. A machine data entry field 101 and a port data entry field 102 are for entering a machine identifier and the port number of the machine that is to be opened. A JIT access period data entry field 103 is for entering the JIT access period, for example, in minutes. A user name data entry field 104, a password data entry field 105, and a token data entry field 106 are for entering the multi-factor authentication information. A suspend allowed list data entry field 107 is for specifying whether the allowed list for applications should be suspended. The display page also includes a submit button 108 for submitting the entered data to the management portal. In some embodiments, the display page may include a data entry field for entering the applications whose execution is needed. Also, the display page would not include the suspend allowed list data entry field if the allowed list was always suspended during JIT access. In some embodiments, the AAS system may maintain a mapping of tasks to the applications needed to perform each task. The display page may include a drop-down list to select one or more tasks to be performed during the JIT access. The AAS system alters the security by ensuring that each application needed to perform the task is in the allowed list.

FIG. 2 is a block diagram that illustrates client devices that connect to machines of a data center in some embodiments. A data center 210 is connected to client devices 220 and possibly attacker devices 230 via a communications channel 240 (e.g., the Internet). The client devices are allowed remote access to the data center via the communications channel. The data center includes various machines 211 and a management portal 212 that are connected via a data center network 213 (e.g., a local area network). The machines may have ports 214 through which the client devices connect to the machines. The machines represent either physical machines or virtual machines that execute on a physical machine. The machines may execute various applications that vary based on the function of the machine. For example, a machine through which an employee logs on to run reports may execute a SQL client application, and a machine that stores the data of a database may execute a SQL server application. As another example, each machine through which web pages are served may execute a web server application, and the machines may be connected to a load-balancing machine that performs load balancing for the web server machines by executing a load-balancing application.

Figure 3:
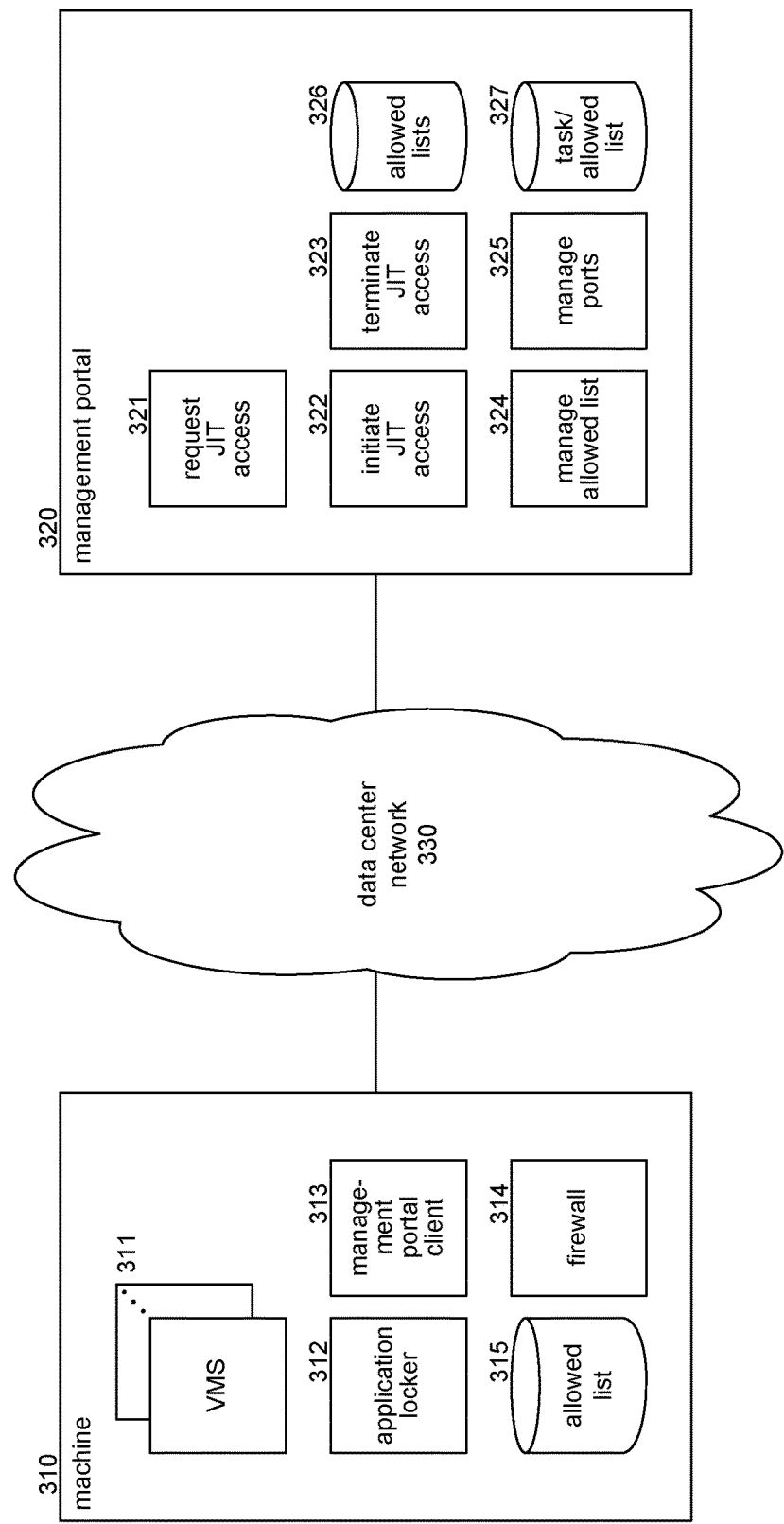
FIG. 3 is a block diagram that illustrates aspects of the AAS system in some embodiments.

FIG. 3 is a block diagram that illustrates aspects of the AAS system in some embodiments. The diagram illustrates a machine 310 of a data center that is connected to a management portal 320 of the data center via a data center network 330. The machine includes virtual machines 311, an application locker component 312, a management portal client component 313, a firewall component 314, and an allowed list store 315. The virtual machines may include an operating system, application code, data storage, and so on that are managed by a virtual machine manager (not illustrated). The application locker component is an example of a security tool that ensures that a virtual machine executes only applications in the allowed list for the virtual machine. The management portal client component provides an interface through which the management portal can control the configuration of various security aspects of the machine and the virtual machines. The firewall component controls the opening and closing of ports. The application locker component, management portal client component, and firewall component may execute separately within the context of each virtual machine. The management portal includes a request JIT access component 321, an initiate JIT access component 322, a terminate JIT access component 323, a manage allowed list component 324, a manage ports component 325, an allowed lists store 326, and a task/allowed list store 327. The request JIT access component is invoked when a user requests JIT access to a machine. The request JIT access component authenticates the user and then initiates and subsequently terminates JIT access to the machine by invoking the initiate JIT access component and the terminate JIT access component. The management portal may include different types of initiate JIT access components and terminate JIT access components for handling of different types of alteration to the security of a machine. For example, the management portal may include components to suspend an allowed list, to use a task-specific allowed list, to augment an allowed list with additional applications, and so on. The manage allowed list component is invoked to manage the allowed lists of the data center. For example, the manage allowed list component may have an application programming interface through which applications can be added to and removed from the allowed lists, the enforcement of an allowed list can be suspended, and so on. The manage ports component may have an application programming interface through which ports of a machine can be opened and closed. The allowed lists store stores the allowed lists for the various machines. The task allowed list store stores, for each task that an administrator can perform, an allowed list of the applications that are needed to perform that task. The data center network may be a local area network connecting the machines of the data center.

The computing systems on which the AAS system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the AAS system. The data transmission media are used for transmitting data via transitory, propagating signals or carrier waves (e.g., electromagnetism) via a wired or wireless connection.

The AAS system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the AAS system may be implemented in hardware using, for example, an application-specific integrated circuit (ASIC).

Figure 4:
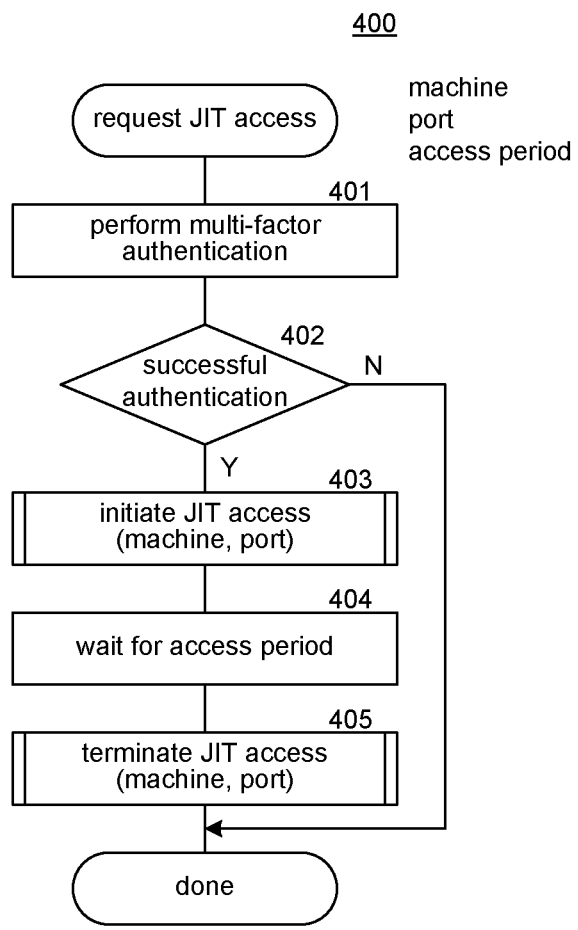
FIG. 4 is a flow diagram that illustrates the processing of a request JIT access component of the AAS system implemented on a management portal in some embodiments.

FIG. 4 is a flow diagram that illustrates the processing of a request JIT access component of the AAS system implemented on a management portal in some embodiments. A request JIT access component 400 is invoked to request JIT access to a machine and may be passed an indication of the machine, the port, and the JIT access period. In block 401, the component performs a multi-factor authentication of the user that is requesting access to the machine. In decision block 402, if the authentication is successful, then the component continues at block 403, else the component completes. In block 403, the component invokes an initiate JIT access component passing an indication of the machine and the port through which JIT access is to be initiated. In block 404, the component may start a timer and wait for the JIT access period to expire. In block 405, after the JIT access period expires, the component invokes a terminate JIT access component passing an indication of the machine and the port to terminate the JIT access. The component then completes. Although the processing of blocks 403-405 is illustrated as being performed when JIT access is requested, the JIT access may be requested for a later time, referred to as a deferred request. For example, an administrator may submit a deferred request to start at a deferred time (e.g., midnight) when a maintenance person is available to access the machine. To support such deferred requests, the AAS system may maintain a list of deferred requests and perform blocks 403-405 at the deferred times.

Figure 5:
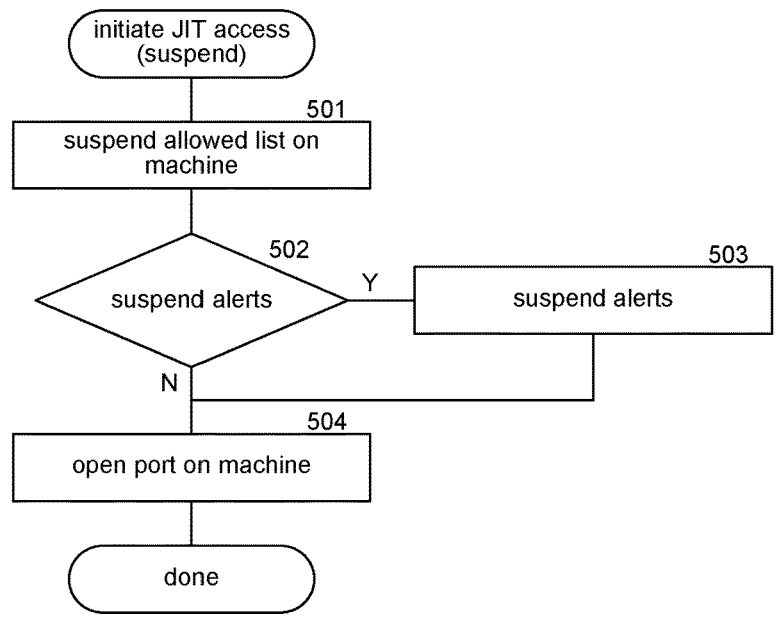
FIG. 5 is a flow diagram that illustrates the processing of an initiate JIT access component to suspend an allowed list of the AAS system in some embodiments.

FIG. 5 is a flow diagram that illustrates the processing of an initiate JIT access component to suspend an allowed list of the AAS system in some embodiments. An initiate JIT access component 500 is invoked to initiate JIT access to a machine via a port by suspending an allowed list. In block 501, the component suspends the allowed list on the machine. For example, the component may invoke an interface of the manage allowed list component, which may configure the machine to suspend the allowed list. In decision block 502, if the alerts are to be suspended, then the component continues at block 503, else the component continues at block 504. In block 503, the component suspends the alerts and continues at block 504. In block 504, the component opens the port on the machine. For example, the component may invoke an interface of the manage ports component, which may configure the firewall to open the port. The component then completes.

Figure 6:
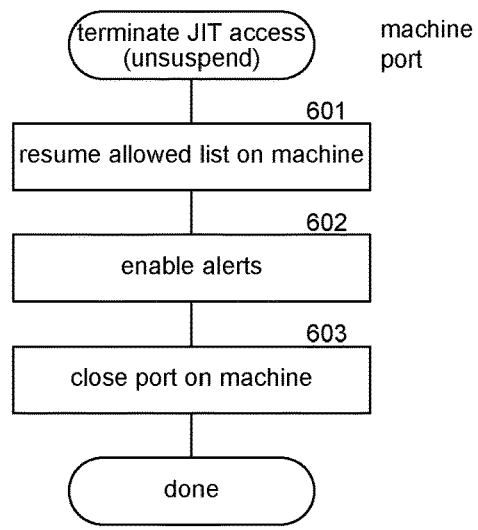
FIG. 6 is a flow diagram that illustrates the processing of a terminate JIT access component to unsuspend an allowed list of the AAS system in some embodiments.

FIG. 6 is a flow diagram that illustrates the processing of a terminate JIT access component to unsuspend an allowed list of the AAS system in some embodiments. A terminate JIT access component 600 is invoked to terminate JIT access on a machine via a port. In block 601, the component resumes the allowed list on the machine. For example, the component may invoke an interface of the manage allowed list component, which may configure the machine to resume the allowed list. In block 602, the component enables the alerts. In block 603, the component closes the port on the machine. For example, the component may invoke an interface of the manage ports component, which may configure the firewall to close the port. The component then completes.

Figure 7:
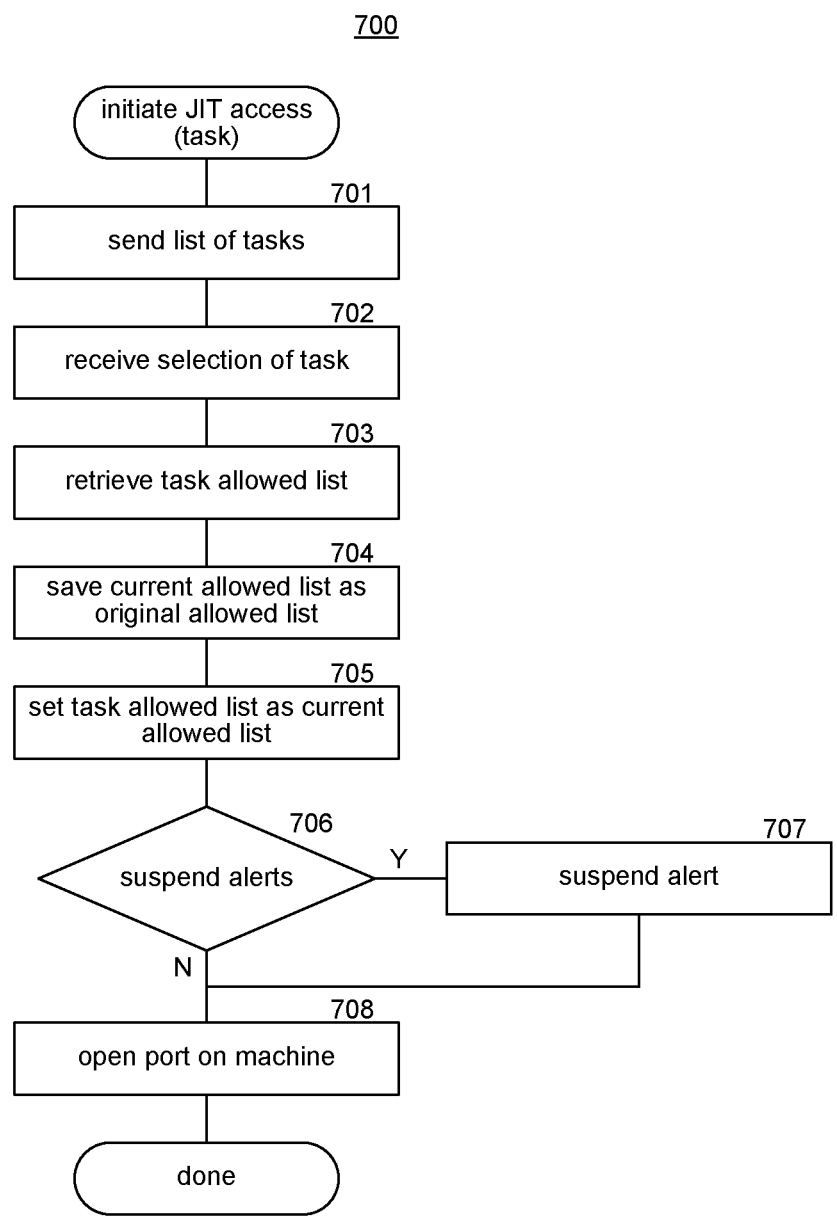
FIG. 7 is a flow diagram that illustrates the processing of an initiate JIT access component to enable a task allowed list of the AAS system in some embodiments.

FIG. 7 is a flow diagram that illustrates the processing of an initiate JIT access component to enable a task allowed list of the AAS system in some embodiments. An initiate JIT access component 700 is invoked to initiate JIT access to a machine via a port to enable a task-specific allowed list. In block 701, the component sends a list of available tasks for display to a user. In block 702, the component receives a selection of a task. In block 703, the component retrieves the task allowed list for the selected task from the task allowed list store. In block 704, the component saves the current allowed list as the original allowed list. In block 705, the component sets the task allowed list as the current allowed list. In decision block 706, if the alerts are to be suspended, then the component continues at block 707, else the component continues at block 708. In block 707, the component suspends the alerts and continues at block 708. In block 708, the component opens the port on the machine. The component then completes.

Figure 8:
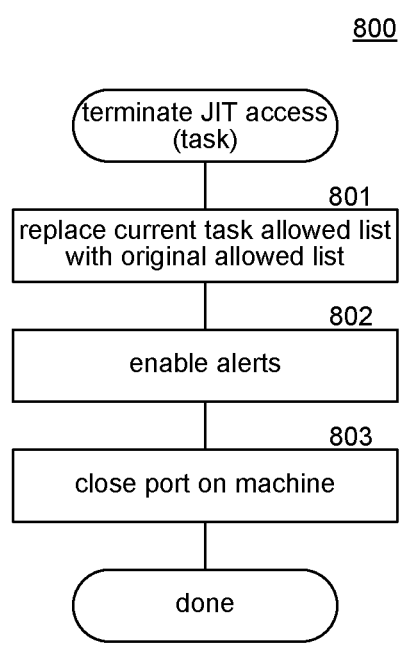
FIG. 8 is a flow diagram that illustrates the processing of a terminate JIT access component to disable a task allowed list of the AAS system in some embodiments.

FIG. 8 is a flow diagram that illustrates the processing of a terminate JIT access component to disable a task allowed list of the AAS system in some embodiments. A terminate JIT access component 800 is invoked to terminate JIT access on a machine via a port and disable a task allowed list. In block 801, the component replaces the current task allowed list with the original allowed list that was saved. In block 802, the component enables the alerts. In block 803, the component closes the port on the machine. The component then completes.

Figure 9:
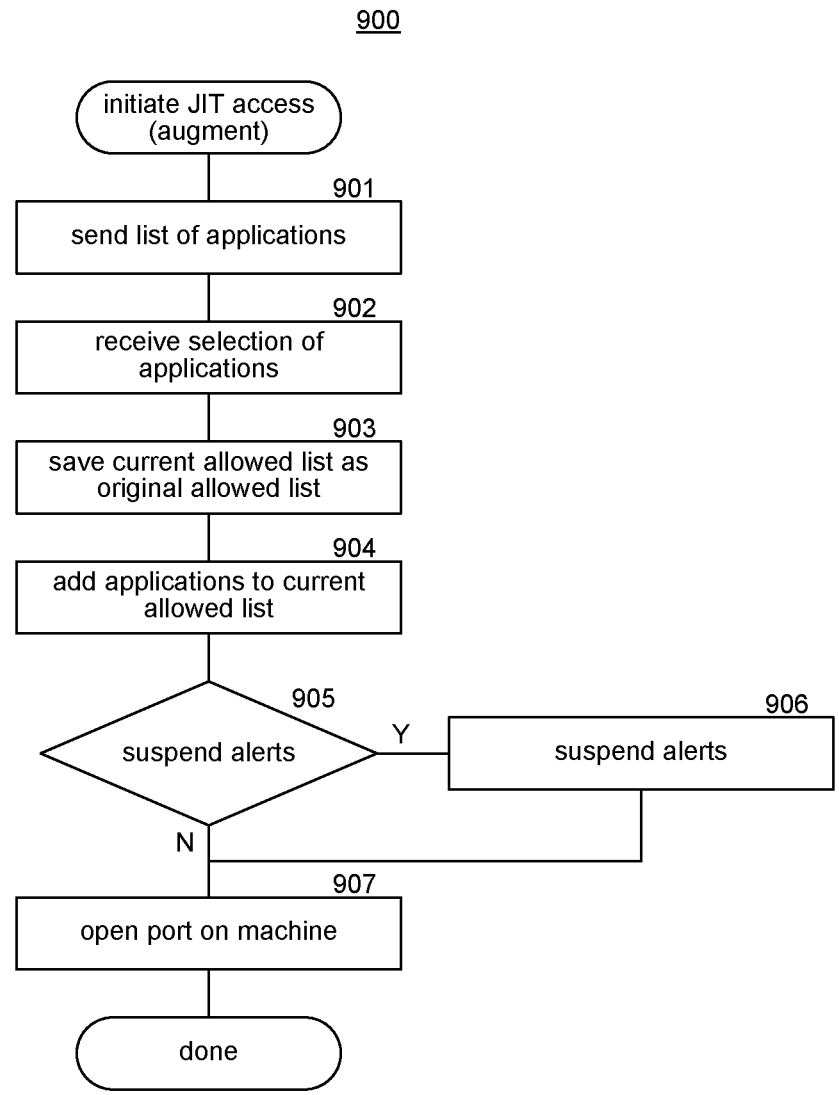
FIG. 9 is a flow diagram that illustrates the processing of an initiate JIT access component to augment an task allowed list of the AAS system in some embodiments.

FIG. 9 is a flow diagram that illustrates the processing of an initiate JIT access component to augment a task allowed list of the AAS system in some embodiments. An initiate JIT access component 900 is invoked to initiate JIT access to a machine via a port to augment an allowed list. In block 901, the component sends a list of available applications for display to a user. In block 902, the component receives a selection of an application. In block 903, the component saves the current allowed list as the original allowed list. In block 904, the component adds the applications to the current allowed list. In decision block 905, if the alerts are to be suspended, then the component continues at block 906, else the component continues at block 907. In block 906, the component suspends the alerts and continues at block 907. In block 907, the component opens the port on the machine. The component then completes.

The following paragraphs describe various embodiments of aspects of the AAS system. An implementation of the AAS system may employ any combination of the embodiments. The processing described below may be performed by a computing device with a processor that executes computer-executable instructions stored on a computer-readable storage medium that implements the AAS system.

In some embodiments, a method performed by a computing device for allowing access to a machine is provided. The method receives a request to allow access to the machine. The method directs a port of the machine to be opened for an access period. The method also directs the machine to alter security relating to applications allowed to execute on the machine for the access period. This allows the machine to be accessed via the port during the access period with the altered security relating to the applications. In some embodiments, after the access period, the port is closed and the security relating to applications is no longer altered. In some embodiments, the machine is a computing device within a cloud data center. In some embodiments, the machine is a virtual machine within a cloud data center. In some embodiments, the request is received by a management portal of a cloud data center. In some embodiments, the directing of the machine to alter security relating to applications is in response to a user requesting to alter security relating to applications. In some embodiments, the altered security includes suspending an allowed list of applications that are allowed to execute on the machine. In some embodiments, the altered security includes suspending a prohibited list of applications that are prohibited from executing on the machine. In some embodiments, the altered security includes suspending alerts that are sent when an application is executed on the machine. In some embodiments, the altered security is based on the privilege level of a user who is to access the machine during the access period. In some embodiments, the method receives an indication of a task to be performed on the machine during the access period. The altered security allows an application that supports performing the task to execute. In some embodiments, the altered security includes augmenting an allowed list with an application.

In some embodiments, a computing system for allowing access to a machine via a port during an access period is provided. The machine is accessed using non-enhanced authentication. The computing system comprises one or more computer-readable storage media storing computer-executable instructions and one or more processors that execute the computer-executable instructions stored in the computer-readable storage media. The instructions control the computing system to perform an enhanced authentication of a user. The instructions control the computing system to receive from the user a request to allow access to the machine during an access period. The instructions control the computing system to direct that the port of the machine be opened for the access period and then closed after the access period. The instructions control the computing system to direct the machine to alter security relating to applications allowed to execute on the machine for the access period and then return to unaltered security after the access period. In some embodiments, the instructions further control the computing system to prompt the user as to whether the security relating to the applications should be altered. In some embodiments, the instructions that direct the machine to alter security further control the computing system to direct the machine to suspend an allowed list of applications that are allowed to execute on the machine. In some embodiments, the instructions that direct the machine to alter security further control the computing system to direct the machine to add an application to an allowed list of applications that are allowed to execute on the machine. In some embodiments, the instructions that direct the machine to alter security further control the computing system to suspend a prohibited list of applications that are prohibited from executing on the machine. In some embodiments, the instructions that direct the machine to alter security further control the computing system to suspend alerts that are sent when an application that is on an alert list is executed on the machine.

In some embodiments, one or computer-readable storage media store computer-executable instructions. The instructions control a computing system to receive a request to allow remote access to a machine during an access period. The instructions control a computing system to direct altering of security relating to applications allowed to execute on the machine for the access period and then return to unaltered security after the access period so that the machine can be remotely accessed during the access period using the altered security. In some embodiments, the instructions further comprise instructions that control the computing system to direct opening of a port of the machine for the access period wherein the port is closed after the access period. In some embodiments, the machine is allowed to execute a certain application, and the altering of security relating to applications prohibits that certain application from executing during the access period.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device for allowing access to a machine, the method comprising:
   receiving a request to allow access to the machine;
   directing a port of the machine to be opened for an access period; and
   directing the machine to alter security relating to applications allowed to execute on the machine for the access period, the altered security including:
      suspending a prohibited list of applications that are prohibited from executing on the machine; and
      suspending alerts that are sent when an application that is on an alert list is executed on the machine;
      wherein the machine can be accessed via the port during the access period with the altered security relating to applications.

2. The method of claim 1 wherein after the access period, the port is closed and the security relating to applications is no longer altered.

3. The method of claim 1 wherein the machine is a computing device within a cloud data center.

4. The method of claim 1 wherein the machine is a virtual machine within a cloud data center.

5. The method of claim 1 wherein the request is received by a management portal of a cloud data center.

6. The method of claim 1 wherein the directing of the machine to alter security relating to applications is in response to a user requesting to alter security relating to applications.

7. The method of claim 1 wherein the altered security includes suspending an allowed list of applications that are allowed to execute on the machine.

8. The method of claim 1 wherein the altered security is based on a privilege level of a user who is to access the machine during the access period.

9. The method of claim 1 further comprising receiving an indication of a task to be performed on the machine during the access period, wherein the altered security allows an application that supports performing the task to execute.

10. A computing system for allowing access to a machine via a port during an access period, the machine accessed using non-enhanced authentication, the computing system comprising:
    one or more computer-readable storage media, which does not include a transitory propagating signal, storing computer-executable instructions for controlling the computing system to:
       perform an enhanced authentication of a user;
       receive from the user a request to allow access to the machine during the access period;
       direct the port of the machine to be opened for the access period and then closed after the access period; and
       direct the machine to alter security relating to applications allowed to execute on the machine for the access period and then return to unaltered security after the access period, the altered security including:
          suspend a prohibited list of applications that are prohibited from executing on the machine; and
          suspend alerts that are sent when an application that is on an alert list is executed on the machine; and
    one or more processors that execute the computer-executable instructions stored in the computer-readable storage media.

11. The computing system of claim 10 wherein the computer-executable instructions further control the computing system to ask the user whether the security relating to applications should be altered.

12. The computing system of claim 10 wherein the computer-executable instructions that direct the machine to alter security further control the computing system to direct the machine to suspend an allowed list of applications that are allowed to execute on the machine.

13. The computing system of claim 10 wherein the computer-executable instructions that direct the machine to alter security further control the computing system to direct the machine to add an application to an allowed list of applications that are allowed to execute on the machine.

14. The computing system of claim 10 wherein the computer-executable instructions that direct the machine to alter security further control the computing system to suspend alerts that are sent when an application that is on an alert list is executed on the machine.

15. One or more computer-readable storage media, which does not include a transitory propagating signal, storing computer-executable instructions, the instructions comprising instructions that control a computing system to:
    receive a request to allow remote access to a machine during an access period; and
    direct altering of security relating to applications allowed to execute on the machine for the access period and then return to unaltered security after the access period so that the machine can be remotely accessed during the access period using the altered security, the altering security including:
       suspending a prohibited list of applications that are prohibited from executing on the machine; and
       suspending alerts that are sent when an application that is on an alert list is executed on the machine.

16. The one or more computer-readable storage media of claim 15 wherein the instructions further comprise instructions that control the computing system to direct opening of a port of the machine for the access period, wherein the port is closed after the access period.

17. The one or more computer-readable storage media of claim 15 wherein the machine is allowed to execute a certain application and the altering of security relating to applications prohibits that certain application from executing during the access period.

* * * * *